United States Patent
Unnerstall

(10) Patent No.: US 10,796,332 B2
(45) Date of Patent: Oct. 6, 2020

(54) SYSTEMS AND METHODS FOR EMBEDDING DIGITAL MODIFIERS IN A DIGITAL WALLET

(71) Applicant: MASTERCARD INTERNATIONAL INCORPORATED, Purchase, NY (US)

(72) Inventor: Rick Unnerstall, O'Fallon, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 213 days.

(21) Appl. No.: 16/122,516

(22) Filed: Sep. 5, 2018

(65) Prior Publication Data

US 2020/0074495 A1    Mar. 5, 2020

(51) Int. Cl.
*G06Q 30/02* (2012.01)
*G06Q 20/36* (2012.01)
*G06Q 20/06* (2012.01)

(52) U.S. Cl.
CPC ..... *G06Q 30/0238* (2013.01); *G06Q 20/0655* (2013.01); *G06Q 20/3678* (2013.01); *G06Q 30/0279* (2013.01)

(58) Field of Classification Search
CPC ..................................................... G06Q 30/02
See application file for complete search history.

(56) References Cited

U.S. PATENT DOCUMENTS

| | | | |
|---|---|---|---|
| 7,356,507 B2 | 4/2008 | Bezos et al. | |
| 8,768,834 B2 * | 7/2014 | Zacarias | G06Q 20/36 705/41 |
| 8,938,402 B2 | 1/2015 | Bishop et al. | |
| 9,015,066 B2 | 4/2015 | Scipioni et al. | |
| 9,524,500 B2 | 12/2016 | Dave et al. | |
| 9,691,055 B2 | 6/2017 | von Behren et al. | |
| 9,721,268 B2 | 8/2017 | Bondesen et al. | |
| 9,824,349 B2 | 11/2017 | Xing et al. | |
| 9,892,434 B2 | 2/2018 | Maenpaa et al. | |
| 2009/0192873 A1 | 7/2009 | Marble | |
| 2012/0150731 A1 * | 6/2012 | Isaacson | G06Q 50/01 705/39 |

(Continued)

FOREIGN PATENT DOCUMENTS

WO    WO-2006004794 A2 *    1/2006    ............. G06Q 30/04

*Primary Examiner* — Marilyn G Macasiano
(74) *Attorney, Agent, or Firm* — Armstrong Teasdale LLP

(57) ABSTRACT

A digital modifier processing system includes a memory and a processor that receives a transaction message for a pending digital wallet payment transaction that includes a digital wallet identifier and a merchant identifier, identifies the digital wallet of the consumer based on the digital wallet identifier, determines, based on the merchant identifier, that the digital wallet of the consumer contains a digital modifier associated with the merchant that was donated by the merchant to a fundraiser as part of a fundraising campaign, the digital modifier identifies (a) one or more of a product and a service and (b) a discount amount for the one or more of the product and the service, verifies one or more of the authenticity and validity of the digital modifier, calculates a modified transaction price based on the discount amount, and transmits the modified transaction price for use in completing the pending payment transaction.

20 Claims, 4 Drawing Sheets

(56) References Cited

U.S. PATENT DOCUMENTS

| | | |
|---|---|---|
| 2013/0179240 A1 | 7/2013 | Lee et al. |
| 2015/0120472 A1* | 4/2015 | Aabye .................... G06Q 20/40 705/16 |
| 2015/0213523 A1* | 7/2015 | Tomich .............. G06Q 30/0601 705/26.1 |
| 2016/0267512 A1 | 9/2016 | Misra et al. |
| 2017/0236143 A1 | 8/2017 | Code et al. |

* cited by examiner

SYSTEMS AND METHODS FOR EMBEDDING DIGITAL MODIFIERS IN A DIGITAL WALLET

BACKGROUND

This disclosure relates generally to digital wallets and, more particularly, to systems and methods for automatically embedding digital modifiers in a digital wallet for modifying certain transaction initiated using the digital wallet.

Non-profit organizations or other organizational entities may periodically engage in fundraising events to raise money for their organization. For example, a youth sports team may sell discount cards for a local merchant or coupon books containing various discounts from multiple merchants. Merchants may voluntarily elect to contribute to such fundraising events by, for example, donating coupons or discount cards for the merchant's products or services to the youth sports team. Members of the youth sports team may then sell such merchant incentives to other consumers, keeping the proceeds for use by the sports team. The purchasing consumers may then use the merchant discounts to purchase that merchant's goods or services at some reduced amount (e.g., "buy one hamburger get one free," "20% off oil change," "five free medium pizzas").

Typically, such merchant incentives are embodied in a tangible item (e.g., a coupon, a card, a product item) that is physically passed between the participating parties. For example, the participating merchant may print discount cards that entitle the bearer to five free medium pizzas, and that merchant may give a those discount cards to the team with the understanding that they will be sold to benefit the organization. The members of that team may then sell the discount cards to other consumers (e.g., for $20 per card), taking cash in exchange for the tangible card at the time of the transaction. The purchasing consumer may then take the tangible card or coupon to the merchant for redemption. As such, the tangible item may be used to represent the bearer's rights to the associated incentive. The tangible item may be configured to identify aspects of the associated incentive (e.g., printing details of the discount on the item), thereby helping both the consumer and the merchant identify, for example, what product or service is discounted and by what amount. Further, the tangible item may also be used to track aspects of the incentive. For example, the free pizza discount card may be marked, punched, or otherwise altered each time the card is used. Once the card has been used five times, the card then becomes invalid for any further discount.

Such tangible items (e.g., printed coupons, paper cards), however, present several problems for the merchant, for the fundraiser, and for the consumer. To redeem the associated benefits from the merchant, the consumer must have the item physically present at the time and place of purchase. However, consumers may lose the item, forget about the item, or may not otherwise have the item at the time they are purchasing the associated product or service. For the fundraiser, acquiring the items from the merchant and distributing the items amongst the sales members provides logistical difficulties in managing the fundraising event. Further, to complete a sale of the incentive during fundraising, the selling member must physically convey the item to the purchaser, thereby making online and remote transactions more difficult. For the merchant, the tangible items present a potential exposure to financial risk. For example, a devious actor may create and distribute, sell, or personally use counterfeit cards without the merchant's approval, thereby compromising the merchant's revenues without their knowledge.

Accordingly, there is a need for a system that can virtualize aspects of the fundraising process and alleviate at least some of these limitations for merchants, fundraisers, and consumers.

BRIEF DESCRIPTION

In one aspect, a digital modifier processing system is provided. The digital modifier processing system includes at least one memory storing information associated with a first digital modifier and a transaction message, and at least one processor configured to execute instructions. The instructions cause the at least one processor to receive the transaction message for a pending payment transaction associated with a digital wallet of a consumer. The pending payment transaction is between a merchant and the consumer. The transaction message includes a digital wallet identifier of the digital wallet and a merchant identifier associated with the merchant. The instructions also cause the at least one processor to identify the digital wallet of the consumer based on the digital wallet identifier. The instructions further cause the at least one processor to determine, based on the merchant identifier, that the digital wallet of the consumer contains a first digital modifier associated with the merchant. The first digital modifier is donated by the merchant to a fundraiser as part of a fundraising campaign in which a fundraiser sells the first digital modifier to the consumer. The first digital modifier identifies (a) one or more of a product and a service and (b) a discount amount for the one or more of the product and the service. The instructions also cause the at least one processor to verify one or more of the authenticity and validity of the first digital modifier. The instructions further cause the at least one processor to calculate a modified transaction price for the one or more of the product and the service based on the discount amount. The instructions also cause the at least one processor to transmit the modified transaction price for use in completing the pending payment transaction.

In another aspect, a computer-implemented method is provided. The method includes receiving a transaction message for a pending payment transaction associated with a digital wallet of a consumer. The pending payment transaction is between a merchant and the consumer. The transaction message includes a digital wallet identifier of the digital wallet and a merchant identifier associated with the merchant. The method also includes identifying the digital wallet of the consumer based on the digital wallet identifier. The method further includes determining, based on the merchant identifier, that the digital wallet of the consumer contains a first digital modifier associated with the merchant. The first digital modifier is donated by the merchant to a fundraiser as part of a fundraising campaign in which a fundraiser sells the first digital modifier to the consumer. The first digital modifier identifies (a) one or more of a product and a service and (b) a discount amount for the one or more of the product and the service. The method also includes verifying one or more of the authenticity and validity of the first digital modifier. The method further includes calculating a modified transaction price for the one or more of the product and the service based on the discount amount. The method also includes transmitting the modified transaction price for use in completing the pending payment transaction.

In a further aspect, a non-transitory computer readable medium that includes computer executable instructions is provided. When executed by a computing device comprising at least one processor in communication with at least one memory device, the computer executable instructions cause the computing device to receive a transaction message for a pending payment transaction associated with a digital wallet of a consumer. The pending payment transaction is between a merchant and the consumer. The transaction message includes a digital wallet identifier of the digital wallet and a merchant identifier associated with the merchant. The instructions also cause the computing device to identify the digital wallet of the consumer based on the digital wallet identifier. The instructions further cause the computing device to determine, based on the merchant identifier, that the digital wallet of the consumer contains a first digital modifier associated with the merchant. The first digital modifier is donated by the merchant to a fundraiser as part of a fundraising campaign in which a fundraiser sells the first digital modifier to the consumer. The first digital modifier identifies (a) one or more of a product and a service and (b) a discount amount for the one or more of the product and the service. The instructions also cause the computing device to verify one or more of the authenticity and validity of the first digital modifier. The instructions further cause the computing device to calculate a modified transaction price for the one or more of the product and the service based on the discount amount. The instructions also cause the computing device to transmit the modified transaction price for use in completing the pending payment transaction.

BRIEF DESCRIPTION OF THE DRAWINGS

FIG. 1 is a diagram illustrating an example digital modifier processing system for facilitating fundraising campaigns in an online network, such as the Internet.

FIG. 2 illustrates an example configuration of a user system that is configured to communicatively communicate within digital modifier processing system shown in FIG. 1.

FIG. 3 illustrates an example configuration of a server system that performs digital modifier processing as described herein within the inventive processing system shown in FIG. 1.

FIG. 4 is an example flow diagram illustrating a method flow by which digital modifier processing server (shown in FIG. 1) performs digital modifier processing, as described herein.

Like numbers in the figures indicate the same or functionally similar components.

DETAILED DESCRIPTION

Figure 1:
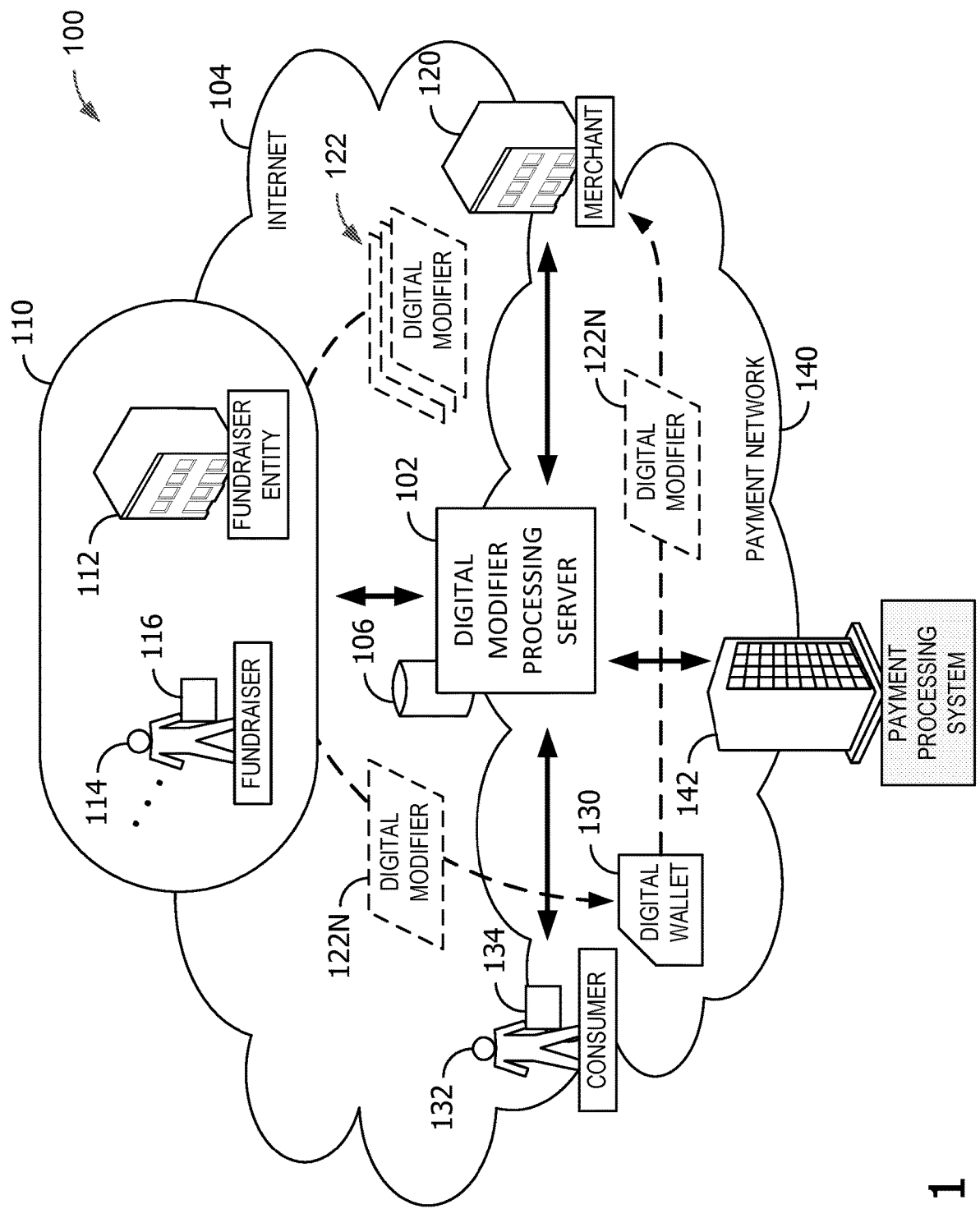
FIGS. 1-4 show example embodiments of the methods and systems described herein.

The use of a digital wallet has quickly gained popularity, both for use in remote-based platforms and in "tap-to-pay" point-of-sale transactions using a cellular telephone, for example. Such services are becoming available under many different brands including those of credit card suppliers and retailers, each of which may interface with different financing companies, and can be offered on different platforms, including point-of-sale technology (e.g., NFC), mobile applications, and remote on-line systems. As consumers use digital wallets with more regularity, it is desirable to allow users to centralize various transactional functionalities within their personal digital wallets, thereby allowing the consumer's use of digital wallets in more types of transactional situations.

The present disclosure relates to an digital modifier processing system that facilitates aspects of fundraising with an associated digital wallet payment implementation system that includes digital modifiers stored within the digital wallet payment implementation system. In an example embodiment, the digital modifier processing system allows merchants to virtually pair with fundraisers for a fundraising campaign. Participating merchants may create and configure merchant incentives (e.g., discounts to products or services) on the digital modifier processing system (e.g., as an online listing). Such "virtualized" merchant incentives are referred to herein as "digital modifiers." Digital modifiers identify incentive aspects such as which products or services are the subject of the incentive (e.g., medium one-topping pizzas, oil changes, hamburgers), what amount those products or services are discounted (e.g., five free, 20% off, buy one get one free), and how many incentives are available to the fundraiser (e.g., 20 incentives, 50 incentives), as well as perhaps other aspects such as a suggested sale price or a dollar amount or range restriction for sale price.

The digital modifier processing system also allows fundraisers to create a fundraising campaign and associate with one or more offered digital modifiers. In some situations, the digital modifier processing system may allow the fundraiser to submit a request for sponsorship to various prospective donor merchants and thereby allow those prospective donor merchants to opt into or out of sponsorship of the fundraising campaign. Once the digital modifier processing system associates a digital modifier with the fundraising campaign, the fundraiser commences selling the digital modifier to consumers. The funds from these "fundraising sales" are retained, in part or in whole, by the fundraiser (e.g., to benefit their non-profit organization, youth sports team, and so forth).

To facilitate both the fundraising sale (e.g., between the fundraiser and the purchasing consumer) and subsequent "retail sales" (e.g., when the purchasing consumer uses the digital modifier), the digital modifier processing system integrates with the digital wallet payment implementation system to provide the digital modifier via the digital wallet of the consumer by storing a digital modifier in the digital wallet wherein the digital modifier represents the merchant incentive. When the consumer purchases the digital modifier, the digital modifier processing system credits the purchased digital modifier to the digital wallet of the consumer, thereby making the digital modifier available during future transactions with that merchant. During a later transaction between the consumer and the merchant, the consumer uses their digital wallet, which then has the digital modifier, to perform a retail sale (e.g., a payment transaction) with the merchant for a product or service that is the subject of the purchased digital modifier (e.g., online, at the merchant's brick-and-mortar store).

More specifically, the digital modifier processing system identifies the digital modifier stored in the digital wallet of the consumer as applicable to the retail sale and applies or otherwise causes the application of the digital modifier to the retail sale. In some embodiments, the digital modifier processing system automatically identifies the presence of the digital modifier within the consumer's digital wallet (e.g., as matching the merchant associated with the present transaction) and presents the digital modifier to the merchant at the time of the retail sale. For example, identification of the digital modifier from the consumer's digital wallet may be triggered by geo-fencing of the merchant and geolocation of the user's digital wallet device, by initiation of a transaction with the digital wallet of the user and a merchant identifier of the merchant, by comparison of a product or service identifier within the retail sale transaction and the product or service identifier associated with the digital modifier, or by user selection of the digital modifier within a graphical user interface (GUI) of the digital wallet. Further, the digital modifier processing system may update or otherwise alter aspects of the digital modifier of the consumer to reflect the completion of the retail sale. For example, after the redemption of one free pizza, the digital modifier processing system may decrement a number of remaining free pizzas associated with the consumer's digital modifier, thereby tracking the number of free pizzas remaining.

The technical problems addressed by the digital modifier processing system include at least one of: (i) inability to protect tangible fundraising articles from fraud (e.g., counterfeiting); (ii) inability to easily network merchants, as prospective donors, with fundraisers; (iii) inability to replace or deactivate tangible fundraising articles that are lost are stolen; (iv) inability to track usage of donated articles; (v) inability to track and manage sales of donated articles; (vi) inability to authenticate and verify tangible fundraising articles at the time of a pending transaction; (vii) inability to automatically apply discounts during a pending transaction; and (viii) inability, by consumers, to track and maintain tangible fundraising articles.

The methods and systems described herein may be implemented using computer programming or engineering techniques including computer software, firmware, hardware, or any combination or subset thereof, wherein the technical effects may be achieved by (i) receiving a transaction message for a pending payment transaction associated with a digital wallet of a consumer, the pending payment transaction being between a merchant and the consumer, the transaction message including a digital wallet identifier of the digital wallet and a merchant identifier associated with the merchant, (ii) identifying the digital wallet of the consumer based on the digital wallet identifier, (iii) determining, based on the merchant identifier, that the digital wallet of the consumer contains a first digital modifier associated with the merchant, the first digital modifier being donated by the merchant to a fundraiser as part of a fundraising campaign in which a fundraiser sells the first digital modifier to the consumer, the first digital modifier identifying (a) one or more of a product and a service and (b) a discount amount for the one or more of the product and the service, (iv) verifying one or more of the authenticity and validity of the first digital modifier, (v) calculating a modified transaction price for the one or more of the product and the service based on the discount amount, and (vi) transmitting the modified transaction price for use in completing the pending payment transaction.

The resulting technical benefits achieved by the fraud detection computing platform include at least one of: (i) performing automatic authentication and validation of digital modifiers during pending transactions to reduce or eliminate certain types of fraud; (ii) integrating digital modifiers with consumers' digital wallets to provide convenience and alerting functionality that allows consumers to better utilize their purchased digital modifiers; (iii) providing automatic application of digital modifiers to modify pending transactions; (iv) providing virtualization and online accessibility to fundraisers and consumers, thereby allowing greater avenues for marketing and sales, as well as broader payment options; and (v) providing automatic tracking of digital modifier usage, to name but a few.

Thus, the digital modifier processing system offers a unique solution to the internet-centric problem of virtualizing fundraising efforts into an online environment on the Internet. Various technical benefits are described above, such as benefits which may be realized by merchant, fundraiser, and consumer computing devices that participate in digital wallet transactions on the Internet and in payment transaction networks. For example, the digital modifier processing system allows merchants to electronically generate and transfer digital modifiers to fundraisers in an online environment, thereby eliminating traditional tangible items associated with merchant incentives and the need to print and manage those tangible items. The digital modifier processing system also allows fundraisers to electronically transfer the digital modifiers to the purchasing consumers and, more specifically, to the digital wallets of those consumers, thereby eliminating the need to perform a physical exchange of cash and tangible items. The digital modifier processing system further allows consumers and merchants to seamlessly utilize digital modifiers, provided through fundraising campaigns, via the consumer's digital wallet, thereby providing aspects of authentication and verification of the benefits to which the consumer is entitled, and allowing a centralization of the digital modifiers with the payment methods made available by the digital wallet.

A "digital wallet" is known in the art and can be used by a consumer associated with the digital wallet for making an electronic transaction. Generally, the digital wallet has a data or information component associated with the consumer and transaction data, including payment devices or methods (e.g., primary account numbers (PANs)), shipping addresses, billing address, and other information. The information component is associated with a consumer interface for the consumer accessing the digital wallet to input necessary information for the transaction. The digital wallet is also associated with a software or services component for authorizing and completing the electronic transaction, including security and encryption for the customer's personal information and for the actual electronic transaction. The system and method of the present disclosure provide functionality and services used to interact with aspects of a consumer's digital wallet and to modify transactions that are conducted using the consumer's digital wallet.

A digital wallet, as used herein, can include any digital wallet suitable for remote or on-line purchases, including those digital wallets offered as a mobile app, particularly, a mobile phone app. Moreover, the digital wallet can include any digital wallet suitable for in-person purchases, such as NFC payments or other such in-person payments.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are examples only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are examples only, and are thus not limiting as to the types of memory usable for storage of a computer program.

In one embodiment, a computer program is provided, and the program is embodied on a computer readable storage medium. In an example embodiment, the system is executed on a single computer system, without requiring a connection to a server computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the disclosure by way of example and not by way of limitation. It is contemplated that the disclosure has general application in industrial, commercial, and academic applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a diagram illustrating an example digital modifier processing system 100 for facilitating fundraising campaigns in an online network, such as the Internet 104. Embodiments described herein may relate to a transaction card system, such as a payment processing system 142 and payment network 140 using the Mastercard interchange network. The Mastercard interchange network is a set of proprietary communications standards promulgated by Mastercard International Incorporated for the exchange of financial transaction data and the settlement of funds between financial institutions that are members of Mastercard International Incorporated. (Mastercard is a registered trademark of Mastercard International Incorporated located in Purchase, N.Y.). Embodiments described herein also relate to an digital modifier processing server 102 that is communicatively coupled to the payment network 140 and the Internet 104. Digital modifier processing server 102 is configured to allow merchants 120, fundraisers 110, and consumers 132 to participate in fundraising campaigns in an online environment, as described herein.

Traditionally, a fundraiser 114 may establish a fundraising campaign to raise funds for a fundraising entity 112 (e.g., a non-profit organization, a charitable organization) (collectively, "fundraiser 110"). For example, a coach or manager of a youth sports team may hope to raise funds to support the team's tournament travel plans for the upcoming season. Local businesses (e.g., merchants 120) often support such organizations by offering coupons or cards that provide their products or services at discounted rates. Those participating businesses may provide, to the fundraiser 110, a certain number of tangible coupons or cards. The fundraiser 110 (e.g., players on the team, parents or siblings of those players, and the like) would then sell those tangible items to various consumers 132 (e.g., their friends and relatives) for a dollar value, and usually in cash. The cash collected from the sale of the tangible items would then be used to fund the team's plans. However, as identified above, the traditional physical fundraising process involving the exchange of tangible items has numerous problems that can be overcome with a technical solution.

The example digital modifier processing system 100 overcomes such problems. In the example embodiment, digital modifier processing system 110 allows merchants 120 to provide digital modifiers 122 to various fundraisers, such as fundraiser 110. As used herein, the term "digital modifier" is used to represent a discount to one or more products or services offered for sale by a particular merchant, and offered up (e.g., for free, or at a discounted price) to a fundraiser for purposes of selling to consumers in support of a fundraising effort to the benefit of the fundraiser's organization (e.g., fundraiser entity 112). In other words, the digital modifier represents an obligation by the merchant to provide the product or service at the identified discounted rate, and the digital modifier is sold by the fundraiser to consumers, with the fundraiser keeping at least part of the profits from that sale.

Some merchants may participate in such fundraising campaigns, for example, for purposes of supporting the community (e.g., to promote public relations), or for supporting a particular youth sport or a particular organization (e.g., the owner is a hockey fan and wants to support youth hockey), or for purposes of branding or advertising (e.g., to entice more future customers to their product). Digital modifiers 122 may be given free of charge (e.g., donated), or may be sold to fundraiser 110 at a particular price (e.g., at a discounted price below full face value).

In the example embodiment, digital modifier processing server 102 provides a graphical user interface (GUI) (not shown) to merchant 120 that allows merchant 120 to configure aspects of digital modifier 122. Digital modifier 122 may include, for example, identification of a particular product or service associated with the incentive (e.g., a product identifier or code identifying medium one-topping pizzas), a discount amount (e.g., free, 50% off, $5.00), a number of digital modifiers being offered (e.g., twenty units, each separately conveyable to a purchasing party, such as consumer 132), and possibly a number of uses for the discount (e.g., five times per unit), limitations on the resale amount allowed for each unit, an expiration date, and which fundraisers 110 are allowed to use digital modifiers 122. Merchant 120 may restrict which fundraisers 110 are able to use digital modifier 122. For example, merchant 120 may restrict digital modifier 122 to a particular organization (e.g., a particular youth sports club), to a particular entity (e.g., a particular youth sports team), or based on various characteristics of the fundraiser (e.g., only to youth soccer teams, only to non-profit corporations, only to charities).

In this example, merchant 120 is a local pizza restaurant with an owner that enjoyed playing soccer as a child and, as such, merchant 120 has decided to support a particular local youth soccer team (e.g., represented here as fundraiser 110). More specifically, merchant 120 is willing to offer twenty (20) digital modifiers 122 to fundraiser 110, each of which represents an obligation to provide five free medium one-topping pizzas from merchant 120 to the purchaser of the digital modifier 122. As such, merchant 120 creates twenty digital modifiers 122 within the GUI provided by digital modifier processing server 102 and configures each digital modifier 122 with a product identifier identifying medium one-topping pizzas, with a discount amount of $0.00 (e.g., "free"), and with a number of uses of five. Digital modifier processing server 102 stores digital modifiers 122 in an incentive database 106, and may make digital modifiers 122 available as a listing on a digital modifiers availability exchange (not separately shown). Further, digital modifier processing server 102 creates a unique identifier, referred to herein as a "digital modifier unit identifier (ID)," for each individual digital modifier 122 (e.g., for each unit). As such, each digital modifier 122 may be uniquely identified, tracked, and modified during later use.

To begin their fundraising efforts, digital modifier processing system 110 allows fundraiser 110 to create a user account for fundraising entity 112 (e.g., the youth sports team) and to create a fundraising campaign on behalf of fundraiser entity 112. Digital modifier processing server 102 provides a graphical user interface (GUI) (not shown) that allows fundraiser 110 to configure aspects of the fundraising campaign, such as creating user accounts for each fundraiser 114 that will participate in the fundraising campaign (e.g., one account for each player on the soccer team), viewing listings of digital modifiers 122 made available by merchants 120, requesting listed digital modifiers 122 from merchants 120, accepting offers of digital modifiers 122 from merchants 120, setting a sale price for digital modifiers 122, and possibly assigning some or all digital modifiers 122 to the various fundraisers 114 (e.g., two per player on a 10-player team, making each player obligated to sell two units).

In this example, through the GUI, fundraiser 110 requests digital modifiers 122 from the listing created by merchant 120. Digital modifier processing server 102 transmits an incentive acquisition request message (e.g., via email, via the digital modifiers availability exchange) to merchant 120 indicating that fundraiser 110 is requesting to acquire digital modifiers 122. Merchant 120 evaluates and approves the acquisition request, causing digital modifier processing server 102 to allocate digital modifiers 122 to fundraiser 110. In some embodiments, merchant 120 may have identified fundraiser 110 as the intended recipient of digital modifiers 122 (e.g., via a unique user name of fundraiser 110), and digital modifier processing server 102 may have automatically allocated digital modifiers 122 to fundraiser 110 (e.g., upon merchant 120 identifying digital modifiers 122 as earmarked for fundraiser 110) or may have transmitted an incentive offer message to fundraiser 110 for acceptance or refusal by fundraiser 110.

Upon allocation of digital modifiers 122, fundraiser 110 commences sales to consumers 132. In this example, multiple fundraisers 114 registered with the fundraising campaign (e.g., the players on the team, their parents or siblings, and so forth). Each fundraiser 114 utilizes a fundraiser computing device 116 (e.g., a personal computer, a mobile computing device) to conduct sales of digital modifiers 122 during the course of the fundraising campaign.

In some embodiments, digital modifier processing server 102 allows fundraiser 114 to offer digital modifiers 122 for sale through a website. When fundraiser 110 creates the fundraising campaign, digital modifier processing server 102 may allow fundraiser to build a website associated with the campaign. The website may provide promotional material for the campaign, perhaps describing a mission statement of the campaign or of the underlying fundraising entity 112, details regarding digital modifiers 122 (e.g., purchase price per unit, merchant sponsoring the incentive, benefits provided by each unit), and promotional material for sponsoring merchants 120 (e.g., links to a website of merchant 120). The website also provides functionality through which consumers 132 may purchase digital modifiers 122. For example, the website may allow consumers 132 to perform a payment card transaction for digital modifiers 122 through payment network 140 (e.g., with a credit or debit card of consumer 132).

In some embodiments, digital modifier processing server 102 allows fundraiser 114 to transmit a sale offer message to consumer 132. The sale offer message may be in the form of an email message, a text message, a social media message, or other such electronic message system. In some embodiments, the sale offer message may include information about the fundraising campaign and a link to the website associated with the campaign, through which consumer 132 may view additional details and purchase digital modifiers 122, as described above. In some embodiments, the sale offer message may include a link (e.g., a custom uniform resource locator (URL)) that allows consumer 132 to directly perform an online transaction for digital modifiers 122 via digital modifier processing server 102 (e.g., circumventing the website content).

After consumer 132 performs a payment card transaction for digital modifiers 122, digital modifier processing server 102 allocates a particular digital modifier 122N of digital modifiers 122 (e.g., by digital modifier unit ID) to digital wallet 130 of consumer 132. This type of transaction, in which consumer 132 purchases digital modifier 122N (e.g., from fundraiser 110), is referred to herein as an "incentive purchase" transaction (i.e., the purchasing of a digital modifier). In some embodiments, the incentive purchase may be performed with a digital wallet 130 of consumer 132 and, as such, digital modifier processing server 102 may transfer the purchased digital modifier 122N to the digital wallet used to complete the purchase transaction. For example, consumer 132 may utilize digital wallet 130 during the incentive purchase, identifying a payment card contained therein, such as a credit or debit card of consumer 132. Upon a successful transaction, digital modifier processing server 102 may identify digital wallet 130 as having been used in the transaction, and therefore transfer digital modifier 122N into digital wallet 130 for later use.

Later, consumer 132 performs a transaction with merchant 120 using digital wallet 130 to purchase goods or services that are associated with the purchased digital modifier 122N. For example, consumer 132 may be dining at the pizza restaurant of merchant 120 or performing an online order of a pizza to be delivered to their home. This type of transaction, in which the purchased digital modifier 122N is utilized during the sale of the associated product or service, is referred to herein as a "modified purchase" (i.e., a purchase that is modified by a previously-purchased digital modifier). In the example embodiment, digital modifier processing server 102 is engaged as a part of the modified purchase.

Digital modifier processing server 102 may be engaged in several distinct ways. In some embodiments, digital modifier processing server 102 performs an automatic application of digital modifier 122N to the modified purchase. More specifically, after a pending transaction is created for the modified purchase (e.g., at a point-of-sale (POS) device of merchant 120 (not separately shown), via an online marketplace of merchant 120, via a digital wallet payment implementation system), transaction data of that pending transaction may be transmitted to digital modifier processing server 102 to determine whether digital wallet 130 includes any digital modifiers that are possibly applicable to the pending transaction.

For example, during the ordering of a medium pizza at the restaurant of merchant 120, a POS device of merchant 120 may transmit a pending transaction message to digital modifier processing server 102. The pending transaction message includes pending transaction data associated with the pending transaction. Pending transaction data may include, for example, merchant information such as a merchant identifier (e.g., uniquely identifying merchant 120), transaction order information such as one or more product or service identifiers (e.g., a product code identifying a medium one-topping pizza) and sale price information (e.g., an unmodified price for the medium one-topping pizza), and consumer information such as a digital wallet identifier of the digital wallet 130 being used in the pending transaction and a payment card identifier of a payment card being used in the pending transaction.

Upon receipt of the pending transaction message, digital modifier processing server 102 automatically analyzes the included pending transaction data to determine whether digital wallet 130 includes any digital modifiers that may be applicable to the pending transaction. In some embodiments, digital modifier processing server 102 may identify one or more digital modifiers of consumer 130 (e.g., digital modifier 122N) based on comparing the merchant identifier from the payment transaction data with merchant identifiers of digital modifiers stored in digital wallet 130. In response to one or more identified digital modifiers, digital modifier processing server 102 may transmit a digital modifier identification message (e.g., to the POS device of merchant 120, to a digital wallet app of consumer 132) that includes data associated with the one or more identified digital modifiers from digital wallet 130. Based on the identified digital modifiers, merchant 120 may manually select one or more digital modifiers to apply to the pending transaction (e.g., selecting a digital modifier via the POS device, manually altering the pending transaction based on viewing the identified digital modifiers), or consumer 132 may manually select one or more digital modifiers to apply to the pending transaction (e.g., via a digital wallet app on consumer computing device 134). As such, the pending transaction may be manually modified based on information received from digital modifier processing server 102 before completing the transaction with consumer 132, allowing consumer 132 to apply the benefits of digital modifier 122N to the pending transaction.

In some embodiments, digital modifier processing server 102 may identify one or more digital modifiers of consumer 130 (e.g., digital modifier 122N) based on comparing the merchant identifier and a product or service identifier from the payment transaction data with merchant identifiers and product or service identifiers of digital modifiers stored in digital wallet 130. In response to one or more identified digital modifiers, the one or more identified digital modifiers may be automatically applied to modify the pending transaction. For example, digital modifier processing server 102 may transmit a transaction modification message to merchant 120 (e.g., to the POS device, to a web portal processing an online transaction) that identifies a modified price for an item in the pending transaction (e.g., price of the pizza item reduced to $0.00) or a discount amount or percentage for an item in the pending transaction or to apply to the entire transaction (e.g., 20% off the pizza item). As such, the pending transaction may be automatically modified by information received from digital modifier processing server 102 before completing the transaction with consumer 132, allowing consumer 132 to apply the benefits of digital modifier 122N to the pending transaction.

In other embodiments, digital modifier processing server 102 performs a prompted authentication and verification of digital modifier 122N. For example, during the pending transaction, consumer 132 may manually attempt to apply digital modifier 122N to the transaction (e.g., by selecting digital modifier 122N from digital wallet 130 via a user interface provided by the digital wallet app during the transaction). In response, a pending transaction message may be sent to digital modifier processing server 102 (e.g., from the digital wallet payment implementation system, from the POS device or payment processor of merchant 120) that includes the identified digital modifier 122N and may include payment transaction data of the pending transaction. In some embodiments, digital modifier processing server 102 may authenticate and validate digital modifier 122N to confirm, for merchant 120, that digital modifier 122N is valid (e.g., that digital modifier 122N is a digital modifier 122 authorized by merchant 120, that digital modifier 122N is not expired or fraudulent, that digital modifier 122N was actually sold to consumer 132). In some embodiments, digital modifier processing server 102 may provide transaction modification information to merchant 120 similar to that described above with respect to transaction modification message. For example, in response to consumer 132 manually selecting digital modifier 122N from digital wallet 130 during the transaction, digital modifier processing server 102 may authenticate the identified digital modifier 122N and, upon successful authentication, may transmit a transaction modification message (e.g., to the POS device of merchant 120 or an associated payment processing system) that provides transaction modification details for use with the pending transaction. As such, based on consumer selection and presentation of digital modifier 122N from digital wallet 130, digital modifier processing server 102 validates and automatically provides the appropriate transaction modifiers for the particular pending transaction based on the transaction details and the identified digital modifier 122N.

In the example embodiment, digital modifier processing server 102 also performs post-transaction management of digital modifiers 122. More specifically, in some embodiments, after a pending transaction involving digital modifier 122N is successfully completed (e.g., including use of digital modifier 122N to affect the intended discount), digital modifier processing server 102 may receive a completed transaction message (e.g., from merchant 120, from payment network 140, from the digital wallet implementation system, and so forth). The completed transaction message may include payment transaction data for the completed transaction (e.g., products or services purchased, merchant identifier of merchant 120, digital wallet identifier of digital wallet 130) and digital modifier information associated with any digital modifiers used during the transaction (e.g., the digital modifier unit ID for digital modifier 122N).

For some types of digital modifiers 122, digital modifier processing server 102 may track a number of successful uses. For example, the "five free pizzas" digital modifier 122 provided by merchant 120 entitles the purchasing consumer to no more than five free successful uses of digital modifier 122N to acquire one medium one-topping pizza each. Accordingly, for such digital modifiers 122, digital modifier processing server 102 may maintain a counter for digital modifier 122N (e.g., incrementing from zero or decrementing from the allowed total after each successful use) based on the received completed transaction message.

In some embodiments, digital modifier processing server 102 may maintain usage information associated with digital modifiers 122 for other purposes, such as for logging, for merchant 120's statistical analysis purposes (e.g., allowing merchant 120 to determine how much their donation was actually used, and thus how much was their realized loss), for fundraiser 110's statistical analysis purposes (e.g., how useful their consumers found this particular digital modifier 122 to be), and for the benefit of consumer 132. For example, in some embodiments, digital modifier processing server 102 may periodically analyze usage information for digital modifier 122N and alert consumer 132 if, for example, they have not yet used digital modifier 122N after a pre-determined period of time since purchase (e.g., one month after purchase), or if they have not used digital modifier 122N for a pre-determined period of time (e.g., unused for the last two months), or if digital modifier 122N is within a pre-determined period of expiring (e.g., within one month of expiration). Digital modifier processing server 102 may transmit an electronic message to consumer 132 indicating such alerts (e.g., via email or text message, via their digital wallet app, via their home nest device, and so forth).

In some embodiments, digital modifier processing system 100 may provide an alert based on proximity between consumer 132 and a merchant's place of business for which the consumer 132 has one or more digital modifiers 122. For example, digital modifier processing system 100 may include a client-side application (not separately shown) installed on consumer computing device 134 that compares user location data of consumer (e.g., global positioning system (GPS) data) to location information for merchant 120 (e.g., based on geo-fencing data of merchant 120's retail locations). More specifically, digital modifier processing system 100 identifies each merchant for which that consumer 132 owns digital modifiers 122. Each of the identified merchants (e.g., merchant 120) may have one or more physical retail spaces at which consumer 132 may potentially use digital modifier 122N, and each of those retail spaces may have a known geo-fenced location. As such, digital modifier processing system 100 may periodically compare a geolocation of consumer 132 (e.g., of the consumer computing device 134 of consumer 132) to the geo-fenced locations of merchant 120. Digital modifier processing system 100 may alert consumer 132 whenever, for example, consumer 132 is within the perimeter of, or within a pre-determined distance of, a retail location of merchant 120. This proximity alert may include information about the associated digital modifier 122N (e.g., "you have two free pizzas available for Merchant X, which is nearby"). In some embodiments, digital modifier processing system 100 may allow consumer to activate an online map of the nearby area, and may provide a locator on that online map of the associated merchant. As such, digital modifier processing system 100 may serve to remind consumer 132 that they possess an active digital modifier, and to alert consumer 132 of available digital modifiers 122N when consumer 132 is physically near an applicable retail location.

In some embodiments, purchased digital modifiers 122N may be associated with a particular payment card of consumer 132. Presume, for example, that consumer 132 purchased digital modifier 122N directly with a particular debit card (e.g., not using digital wallet 130). Digital modifier processing server 102 may associate digital modifier 122N with that particular debit card, thereby tying ownership and use of digital modifier 122N to that particular debit card of consumer 132. During a later transaction, digital modifier 122N may be activated based on the use of that particular debit card, and in ways similar to activation from digital wallet 130. For example, if consumer 132 uses that particular debit card at merchant 120, digital modifier processing server 102 may receive payment card information associated with the transaction as a part of the pending transaction message. Digital modifier processing server 102 may identify availability of digital modifier 122N based on association between the debit card and digital modifier 122N (e.g., as a proxy for ownership of digital modifier 122N by consumer 132 in lieu of digital wallet 130), and thus similarly use digital modifier 122N to similarly provide the discussed transaction modification functionality during the transaction.

In the example embodiment, digital modifier processing server 102 operates as a third-party application supporting merchants 120, fundraisers 110, consumers 132 and various payment processing entities such as payment processing system 142 of payment network 140 or the digital wallet implementation system providing digital wallet 130. In other embodiments, digital modifier processing server 102 may operate as a part of payment network 140 or as a part of the digital wallet implementation system (e.g., as an additional payment transaction service within existing payment networks).

Figure 2:
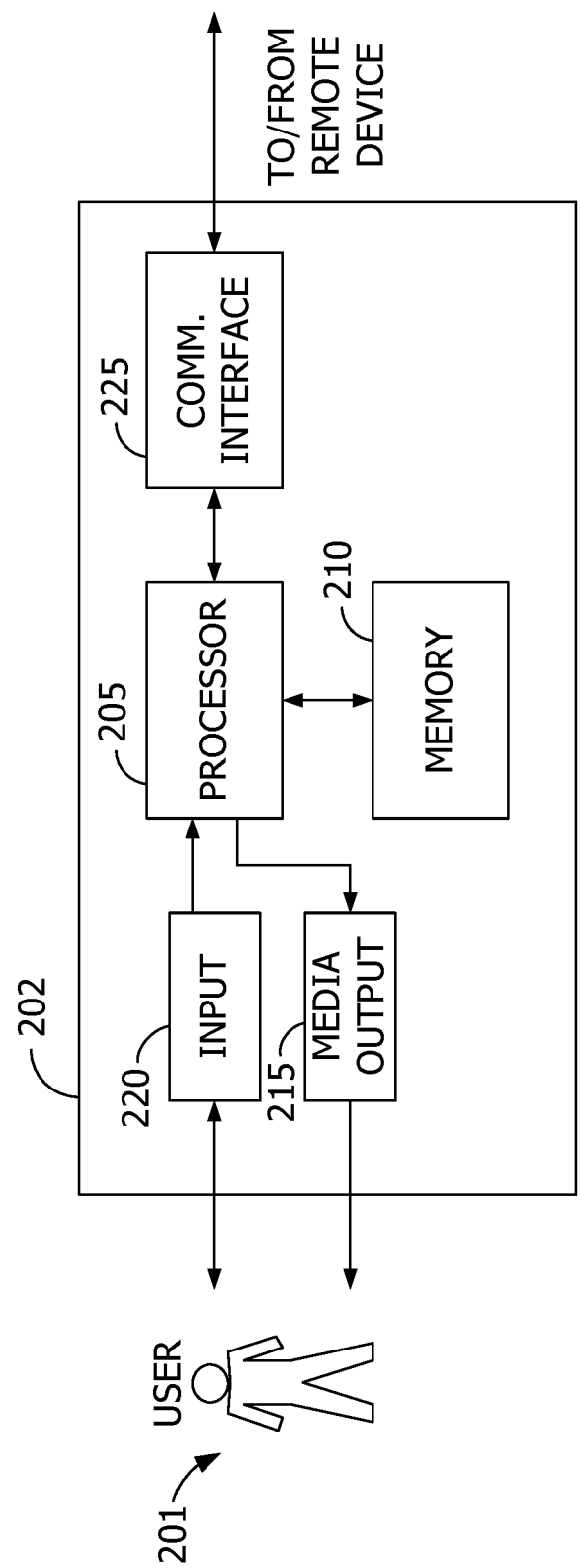

FIG. 2 illustrates an example configuration of a user system 202 that is configured to communicatively communicate within digital modifier processing system 100 shown in FIG. 1 (e.g., with digital modifier processing server 102, payment network 140, over Internet 104, and so forth). User system 202 may include, but is not limited to, consumer computing device 134 or fundraiser computing device 116. In the example embodiment, user system 202 includes a processor 205 for executing instructions. In some embodiments, executable instructions are stored in a memory area 210. Processor 205 may include one or more processing units, for example, a multi-core configuration. Memory area 210 is any device allowing information such as executable instructions and/or written works to be stored and retrieved. Memory area 210 may include one or more computer readable media.

User system 202 also includes at least one media output component 215 for presenting information to user 201. Media output component 215 is any component capable of conveying information to user 201. For example, media output component 215 may be a display component configured to display component lifecycle data in the form of reports, dashboards, communications, or the like. In some embodiments, media output component 215 includes an output adapter such as a video adapter and/or an audio adapter. An output adapter is operatively coupled to processor 305 and operatively connectable to an output device such as a display device, a liquid crystal display (LCD), organic light emitting diode (OLED) display, or "electronic ink" display, or an audio output device, a speaker or headphones.

In some embodiments, user system 202 includes an input device 220 for receiving input from user 201. Input device 220 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 215 and input device 220. User system 202 may also include a communication interface 225, which is communicatively connectable to a remote device such as digital modifier processing server 102. Communication interface 225 may include, for example, a wired or wireless network adapter or a wireless data transceiver for use with a mobile phone network, Global System for Mobile communications (GSM), 3G, or other mobile data network or Worldwide Interoperability for Microwave Access (WI-MAX).

Stored in memory area 210 are, for example, computer readable instructions for providing a user interface to user 201 via media output component 215 and, optionally, receiving and processing input from input device 220. A user interface may include, among other possibilities, a web browser and client application. Web browsers enable users, such as user 301, to display and interact with media and other information typically embedded on a web page or a website from digital modifier processing server 102. A client application allows user 201 to interact with a server application from digital modifier processing server 102.

Figure 3:
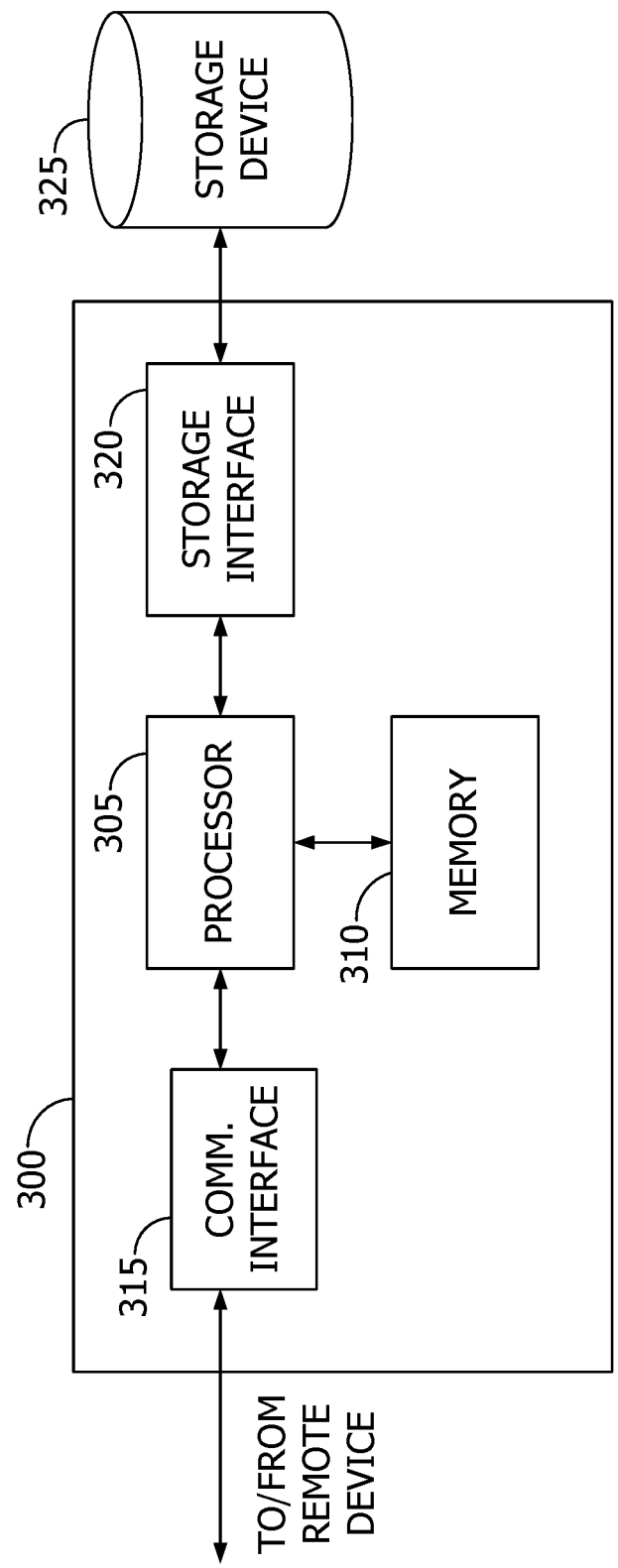

FIG. 3 illustrates an example configuration of a server system 300 that performs digital modifier processing as described herein within the inventive processing system 100 shown in FIG. 1. In some embodiments, server system 300 is similar to digital modifier processing server 102.

Server system 300 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on the server system 301, such as UNIX, LINUX, Microsoft Windows®, etc. More specifically, the instructions may cause various data manipulations on data stored in incentive database 106 (e.g., create, read, update, and delete procedures). It should also be appreciated that upon initiation of a computer-based method, various instructions may be executed during initialization. Some operations may be required in order to perform one or more processes described herein, while other operations may be more general and/or specific to a particular programming language (e.g., C, C #, C++, Java, or other suitable programming languages, etc.).

Processor 305 is operatively coupled to a communication interface 315 such that server system 300 is capable of communicating with a remote device such as a user system 202 or another server system 300. For example, communication interface 315 may receive communications from fundraiser computing devices 116, consumer computing devices 134, or merchant 120 via the Internet 104, as illustrated in FIG. 1, or from payment processing system 142, a merchant POS device, or a digital wallet payment implementation system over payment network 140, as illustrated in FIG. 1.

Processor 305 may also be operatively coupled to a storage device 325. Storage device 325 is any computer-operated hardware suitable for storing and/or retrieving data. In some embodiments, storage device 325 is integrated in server system 300. In other embodiments, storage device 325 is external to server system 300, and may be similar to incentives database 106. For example, server system 300 may include one or more hard disk drives as storage device 325. In other embodiments, storage device 325 is external to server system 300 and may be accessed by a plurality of server systems 325. For example, storage device 325 may include multiple storage units such as hard disks or solid state disks in a redundant array of inexpensive disks (RAID) configuration. Storage device 325 may include a storage area network (SAN) and/or a network attached storage (NAS) system.

In some embodiments, processor 305 is operatively coupled to storage device 325 via a storage interface 320. Storage interface 320 is any component capable of providing processor 305 with access to storage device 325. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 325.

Memory area 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are examples only, and are thus not limiting as to the types of memory usable for storage of a computer program.

Figure 4:
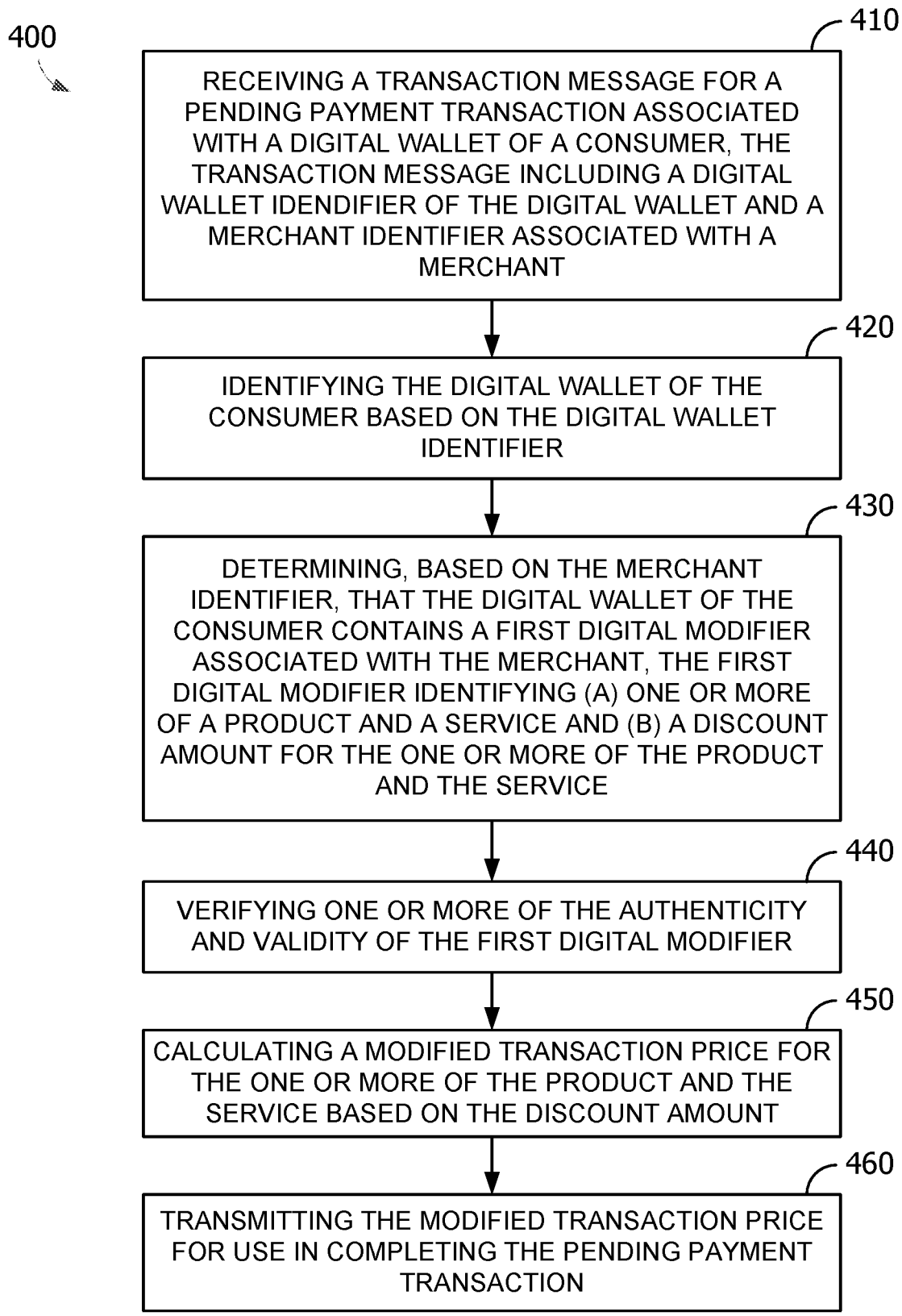

FIG. 4 is an example flow diagram illustrating a method flow 400 by which digital modifier processing server 102 (shown in FIG. 1) performs digital modifier processing, as described herein. In the example embodiment, digital modifier processing server 102 receives a transaction message for a pending payment transaction associated with a digital wallet of a consumer, the pending payment transaction being between a merchant and the consumer, the transaction message including a digital wallet identifier of the digital wallet and a merchant identifier associated with the merchant (see operation 410). Digital modifier processing server 102 also identifies the digital wallet of the consumer based on the digital wallet identifier (see operation 420). Digital modifier processing server 102 further determines, based on the merchant identifier, that the digital wallet of the consumer contains a first digital modifier associated with the merchant, the first digital modifier being donated by the merchant to a fundraiser as part of a fundraising campaign in which a fundraiser sells the first digital modifier to the consumer, the first digital modifier identifying (a) one or more of a product and a service and (b) a discount amount for the one or more of the product and the service (see operation 430).

In the exemplary embodiment, digital modifier processing server 102 also verifies one or more of the authenticity and validity of the first digital modifier (see operation 440). Digital modifier processing server 102 further calculates a modified transaction price for the one or more of the product and the service based on the discount amount (see operation 450). Digital modifier processing server 102 also transmits the modified transaction price for use in completing the pending payment transaction (see operation 460).

In some embodiments, digital modifier processing server 102 also displays a merchant graphical user interface to the merchant, the merchant graphical user interface including a merchant incentive donation screen configured to allow the merchant to configure the first digital modifier prior to donating. In some embodiments, digital modifier processing server 102 further receives, from the merchant through the merchant graphical user interface, an indication of an identifier associated with the one or more of the product and the service. In some embodiments, digital modifier processing server 102 also receives, from the merchant through the merchant graphical user interface, an indication of the discount amount for the one or more of the product and the service. In some embodiments, digital modifier processing server 102 further receives, from the merchant through the merchant graphical user interface, a number of units of digital modifiers to be donated from the merchant. In some embodiments, digital modifier processing server 102 also creates, in an incentives database, one or more digital modifiers for the merchant equal to the number of units, the one or more digital modifiers including the first digital modifier. In some embodiments, digital modifier processing server 102 further assigns the one or more digital modifiers to the fundraiser.

In some embodiments, digital modifier processing server 102 also generates a uniform resource locator (URL) associated with the fundraising campaign, the URL being configured to direct the consumer to a payment processing site configured to allow the purchase of the first digital modifier. In some embodiments, digital modifier processing server 102 further receives an indication that the consumer has accessed the URL and submitted an incentive purchase transaction for the first digital modifier. In some embodiments, digital modifier processing server 102 also performs, by the computing device, the incentive purchase transaction involving the customer, and for the first digital modifier. In some embodiments, digital modifier processing server 102 further transfers the first digital modifier to the digital wallet of the consumer based on success of the incentive purchase transaction.

In some embodiments, digital modifier processing server 102 also displays a fundraiser graphical user interface to the fundraiser, the fundraiser graphical user interface including a merchant incentive selection screen configured to allow the fundraiser to one or more of view, request, and accept an offer for the first digital modifier. In some embodiments, digital modifier processing server 102 further presents, to the fundraiser through the fundraiser graphical user interface, an offer from the merchant to the fundraiser for the first digital modifier. In some embodiments, digital modifier processing server 102 also transfers the first digital modifier to the digital wallet of the consumer upon receiving an indication of acceptance of the first digital modifier.

In some embodiments, the transaction message further includes one or more of a product identifier and a service identifier associated with the one or more of the product and the service, and determining that the digital wallet of the consumer contains a first digital modifier associated with the merchant further includes determining that the one or more of the product and the service of the first digital modifier matches the one or more of the product identifier and the service identifier.

In some embodiments, digital modifier processing server 102 also receives an indication of a successful completion of the pending payment transaction. In some embodiments, digital modifier processing server 102 further alters a usage counter associated with the first digital modifier based on the received indication of the successful completion. In some embodiments, digital modifier processing server 102 also denies another pending transaction associated with the first digital modifier based on the value of the usage counter.

In some embodiments, digital modifier processing server 102 also tracks usage information associated with successful transactions that use the first digital modifier. In some embodiments, digital modifier processing server 102 further determines that the first digital modifier one of (a) has not been used within a pre-determined length of time since purchase, (b) has not been used within a pre-determined length of time since last use, and (c) is within a pre-determined amount of time from expiring. In some embodiments, digital modifier processing server 102 also transmits an alert message to the consumer indicating the particular lack of use of the first digital modifier.

As will be appreciated based on the foregoing specification, the above-described embodiments of the disclosure may be implemented using computer programming or engineering techniques including computer software, firmware, hardware or any combination or subset thereof, wherein the technical effect is to provide virtualization and fraud security around fundraising and redemption in an online payment transaction environment. Any such resulting program, having computer-readable code means, may be embodied or provided within one or more computer-readable media, thereby making a computer program product, (i.e., an article of manufacture), according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A digital modifier processing system comprising:
  at least one memory storing information associated with a first digital modifier and a transaction message; and
  at least one processor configured to execute instructions that cause the at least one processor to:
    receive the transaction message for a pending payment transaction associated with a digital wallet of a consumer, the pending payment transaction is between a merchant and the consumer, the transaction message includes a digital wallet identifier of the digital wallet and a merchant identifier associated with the merchant;
    identify the digital wallet of the consumer based on the digital wallet identifier;
    determine, based on the merchant identifier, that the digital wallet of the consumer contains a first digital modifier associated with the merchant, the first digital modifier is donated by the merchant to a fundraiser as part of a fundraising campaign in which a fundraiser sells the first digital modifier to the consumer, the first digital modifier identifies (a) one or more of a product and a service and (b) a discount amount for the one or more of the product and the service;
verify one or more of the authenticity and validity of the first digital modifier;
calculate a modified transaction price for the one or more of the product and the service based on the discount amount; and
transmit the modified transaction price for use in completing the pending payment transaction.

2. The digital modifier processing system of claim 1, wherein the instructions further cause the at least one processor to:
display a merchant graphical user interface to the merchant, the merchant graphical user interface includes a merchant incentive donation screen configured to allow the merchant to configure the first digital modifier prior to donating;
receive, from the merchant through the merchant graphical user interface, an indication of an identifier associated with the one or more of the product and the service;
receive, from the merchant through the merchant graphical user interface, an indication of the discount amount for the one or more of the product and the service; and
receive, from the merchant through the merchant graphical user interface, a number of units of digital modifiers to be donated from the merchant;
create, in an incentives database, one or more digital modifiers for the merchant equal to the number of units, the one or more digital modifiers including the first digital modifier; and
assign the one or more digital modifiers to the fundraiser.

3. The digital modifier processing system of claim 1, wherein the instructions further cause the at least one processor to:
generate a uniform resource locator (URL) associated with the fundraising campaign, the URL is configured to direct the consumer to a payment processing site configured to allow the purchase of the first digital modifier;
receive an indication that the consumer has accessed the URL and submitted an incentive purchase transaction for the first digital modifier;
perform the incentive purchase transaction involving the customer, and for the first digital modifier; and
transfer the first digital modifier to the digital wallet of the consumer based on success of the incentive purchase transaction.

4. The digital modifier processing system of claim 1, wherein the instructions further cause the at least one processor to:
display a fundraiser graphical user interface to the fundraiser, the fundraiser graphical user interface includes a merchant incentive selection screen configured to allow the fundraiser to one or more of view, request, and accept an offer for the first digital modifier;
present, to the fundraiser through the fundraiser graphical user interface, an offer from the merchant to the fundraiser for the first digital modifier; and
transfer the first digital modifier to the digital wallet of the consumer upon receiving an indication of acceptance of the first digital modifier.

5. The digital modifier processing system of claim 1, wherein the transaction message further includes one or more of a product identifier and a service identifier associated with the one or more of the product and the service,
wherein determining that the digital wallet of the consumer contains a first digital modifier associated with the merchant further includes determining that the one or more of the product and the service of the first digital modifier matches the one or more of the product identifier and the service identifier.

6. The digital modifier processing system of claim 1, wherein the instructions further cause the at least one processor to:
receive an indication of a successful completion of the pending payment transaction;
alter a usage counter associated with the first digital modifier based on the received indication of the successful completion; and
deny another pending transaction associated with the first digital modifier based on the value of the usage counter.

7. The digital modifier processing system of claim 1, wherein the instructions further cause the at least one processor to:
track usage information associated with successful transactions that use the first digital modifier;
determine that the first digital modifier one of (a) has not been used within a pre-determined length of time since purchase, (b) has not been used within a pre-determined length of time since last use, and (c) is within a pre-determined amount of time from expiring; and
transmit an alert message to the consumer indicating the particular lack of use of the first digital modifier.

8. A computer-implemented method comprising:
receiving a transaction message for a pending payment transaction associated with a digital wallet of a consumer, the pending payment transaction being between a merchant and the consumer, the transaction message including a digital wallet identifier of the digital wallet and a merchant identifier associated with the merchant;
identifying the digital wallet of the consumer based on the digital wallet identifier;
determining, based on the merchant identifier, that the digital wallet of the consumer contains a first digital modifier associated with the merchant, the first digital modifier being donated by the merchant to a fundraiser as part of a fundraising campaign in which a fundraiser sells the first digital modifier to the consumer, the first digital modifier identifying (a) one or more of a product and a service and (b) a discount amount for the one or more of the product and the service;
verifying one or more of the authenticity and validity of the first digital modifier;
calculating a modified transaction price for the one or more of the product and the service based on the discount amount; and
transmitting the modified transaction price for use in completing the pending payment transaction.

9. The method of claim 8, further comprising:
displaying a merchant graphical user interface to the merchant, the merchant graphical user interface including a merchant incentive donation screen configured to allow the merchant to configure the first digital modifier prior to donating;
receiving, from the merchant through the merchant graphical user interface, an indication of an identifier associated with the one or more of the product and the service;

receiving, from the merchant through the merchant graphical user interface, an indication of the discount amount for the one or more of the product and the service; and receiving, from the merchant through the merchant graphical user interface, a number of units of digital modifiers to be donated from the merchant;

creating, in an incentives database, one or more digital modifiers for the merchant equal to the number of units, the one or more digital modifiers including the first digital modifier; and assigning the one or more digital modifiers to the fundraiser.

10. The method of claim 8, further comprising:

generating a uniform resource locator (URL) associated with the fundraising campaign, the URL being configured to direct the consumer to a payment processing site configured to allow the purchase of the first digital modifier;

receiving an indication that the consumer has accessed the URL and submitted an incentive purchase transaction for the first digital modifier;

performing, by the computing device, the incentive purchase transaction involving the customer, and for the first digital modifier; and transferring the first digital modifier to the digital wallet of the consumer based on success of the incentive purchase transaction.

11. The method of claim 8, further comprising:

displaying a fundraiser graphical user interface to the fundraiser, the fundraiser graphical user interface including a merchant incentive selection screen configured to allow the fundraiser to one or more of view, request, and accept an offer for the first digital modifier;

presenting, to the fundraiser through the fundraiser graphical user interface, an offer from the merchant to the fundraiser for the first digital modifier; and transferring the first digital modifier to the digital wallet of the consumer upon receiving an indication of acceptance of the first digital modifier.

12. The method of claim 8, wherein the transaction message further includes one or more of a product identifier and a service identifier associated with the one or more of the product and the service, wherein determining that the digital wallet of the consumer contains a first digital modifier associated with the merchant further includes determining that the one or more of the product and the service of the first digital modifier matches the one or more of the product identifier and the service identifier.

13. The method of claim 8, further comprising:

receiving an indication of a successful completion of the pending payment transaction;

altering a usage counter associated with the first digital modifier based on the received indication of the successful completion; and denying another pending transaction associated with the first digital modifier based on the value of the usage counter.

14. The method of claim 8, further comprising:

tracking usage information associated with successful transactions that use the first digital modifier;

determining that the first digital modifier one of (a) has not been used within a pre-determined length of time since purchase, (b) has not been used within a pre-determined length of time since last use, and (c) is within a pre-determined amount of time from expiring; and transmitting an alert message to the consumer indicating the particular lack of use of the first digital modifier.

15. A non-transitory computer readable medium that includes computer executable instructions wherein, when executed by a computing device comprising at least one processor in communication with at least one memory device, the computer executable instructions cause the computing device to:

receive a transaction message for a pending payment transaction associated with a digital wallet of a consumer, the pending payment transaction is between a merchant and the consumer, the transaction message includes a digital wallet identifier of the digital wallet and a merchant identifier associated with the merchant;

identify the digital wallet of the consumer based on the digital wallet identifier;

determine, based on the merchant identifier, that the digital wallet of the consumer contains a first digital modifier associated with the merchant, the first digital modifier is donated by the merchant to a fundraiser as part of a fundraising campaign in which a fundraiser sells the first digital modifier to the consumer, the first digital modifier identifies (a) one or more of a product and a service and (b) a discount amount for the one or more of the product and the service;

verify one or more of the authenticity and validity of the first digital modifier;

calculate a modified transaction price for the one or more of the product and the service based on the discount amount; and transmit the modified transaction price for use in completing the pending payment transaction.

16. The non-transitory computer readable medium of claim 15, wherein the computer executable instructions further cause the processor to:

display a merchant graphical user interface to the merchant, the merchant graphical user interface includes a merchant incentive donation screen configured to allow the merchant to configure the first digital modifier prior to donating;

receive, from the merchant through the merchant graphical user interface, an indication of an identifier associated with the one or more of the product and the service;

receive, from the merchant through the merchant graphical user interface, an indication of the discount amount for the one or more of the product and the service; and receive, from the merchant through the merchant graphical user interface, a number of units of digital modifiers to be donated from the merchant;

create, in an incentives database, one or more digital modifiers for the merchant equal to the number of units, the one or more digital modifiers including the first digital modifier; and assign the one or more digital modifiers to the fundraiser.

17. The non-transitory computer readable medium of claim 15, wherein the computer executable instructions further cause the processor to:

generate a uniform resource locator (URL) associated with the fundraising campaign, the URL is configured to direct the consumer to a payment processing site configured to allow the purchase of the first digital modifier;

receive an indication that the consumer has accessed the URL and submitted an incentive purchase transaction for the first digital modifier;

perform the incentive purchase transaction involving the customer, and for the first digital modifier; and transfer the first digital modifier to the digital wallet of the consumer based on success of the incentive purchase transaction.

18. The non-transitory computer readable medium of claim 15, wherein the computer executable instructions further cause the processor to:

display a fundraiser graphical user interface to the fundraiser, the fundraiser graphical user interface includes a merchant incentive selection screen configured to allow the fundraiser to one or more of view, request, and accept an offer for the first digital modifier;

present, to the fundraiser through the fundraiser graphical user interface, an offer from the merchant to the fundraiser for the first digital modifier; and transfer the first digital modifier to the digital wallet of the consumer upon receiving an indication of acceptance of the first digital modifier.

19. The non-transitory computer readable medium of claim 15, wherein the transaction message further includes one or more of a product identifier and a service identifier associated with the one or more of the product and the service, wherein determining that the digital wallet of the consumer contains a first digital modifier associated with the merchant further includes determining that the one or more of the product and the service of the first digital modifier matches the one or more of the product identifier and the service identifier.

20. The non-transitory computer readable medium of claim 15, wherein the computer executable instructions further cause the processor to:

receive an indication of a successful completion of the pending payment transaction;

alter a usage counter associated with the first digital modifier based on the received indication of the successful completion; and deny another pending transaction associated with the first digital modifier based on the value of the usage counter.

* * * * *